US012435093B2

(12) United States Patent
Li

(10) Patent No.: US 12,435,093 B2
(45) Date of Patent: Oct. 7, 2025

(54) FREE BASE CRYSTALS

(71) Applicant: INTRA-CELLULAR THERAPIES, INC., New York, NY (US)

(72) Inventor: Peng Li, New Milford, NJ (US)

(73) Assignee: INTRA-CELLULAR THERAPIES, INC., Bedminster, NJ (US)

(*) Notice: Subject to any disclaimer, the term of this patent is extended or adjusted under 35 U.S.C. 154(b) by 522 days.

(21) Appl. No.: 17/997,983

(22) PCT Filed: May 6, 2021

(86) PCT No.: PCT/US2021/031197
§ 371 (c)(1),
(2) Date: Nov. 4, 2022

(87) PCT Pub. No.: WO2021/226407
PCT Pub. Date: Nov. 11, 2021

(65) Prior Publication Data
US 2023/0174543 A1 Jun. 8, 2023

Related U.S. Application Data

(60) Provisional application No. 63/020,972, filed on May 6, 2020.

(51) Int. Cl.
C07D 487/14 (2006.01)

(52) U.S. Cl.
CPC ........ C07D 487/14 (2013.01); C07B 2200/13 (2013.01)

(58) Field of Classification Search
CPC .................. C07D 487/14; C07B 2200/13
See application file for complete search history.

(56) References Cited

U.S. PATENT DOCUMENTS

| | | | |
|---|---|---|---|
| 8,273,750 B2 | 9/2012 | Li et al. | |
| 8,273,751 B2 | 9/2012 | Li | |
| 8,536,159 B2 | 9/2013 | Li et al. | |
| 8,633,180 B2 | 1/2014 | Li et al. | |
| 8,664,207 B2 | 3/2014 | Li et al. | |
| 8,829,008 B2 | 9/2014 | Li | |
| 8,858,911 B2 | 10/2014 | Li et al. | |
| 9,000,001 B2 | 4/2015 | Li et al. | |
| 9,006,258 B2 | 4/2015 | Fienberg et al. | |
| 9,198,924 B2 | 12/2015 | Mates et al. | |
| 9,630,971 B2 | 4/2017 | Abe et al. | |
| 2001/0034450 A1 | 10/2001 | Alexander et al. | |
| 2004/0152712 A1 | 8/2004 | Bunnage et al. | |
| 2005/0075795 A1 | 4/2005 | Pandit | |
| 2005/0080107 A1 | 4/2005 | Ochiai et al. | |
| 2010/0273754 A1 | 10/2010 | Li et al. | |
| 2011/0312978 A1 | 12/2011 | Davis et al. | |
| 2012/0053190 A1 | 3/2012 | Fienberg et al. | |
| 2012/0070443 A1 | 3/2012 | Movsesian | |
| 2013/0085123 A1 | 4/2013 | Li et al. | |
| 2013/0331363 A1 | 12/2013 | Li et al. | |
| 2014/0005155 A1 | 1/2014 | Li et al. | |
| 2014/0011783 A1 | 1/2014 | Li et al. | |
| 2014/0148421 A1 | 5/2014 | Li et al. | |
| 2014/0194396 A1 | 7/2014 | Li et al. | |
| 2014/0357606 A1 | 12/2014 | Li | |
| 2015/0038474 A1 | 2/2015 | Li et al. | |
| 2015/0072965 A1 | 3/2015 | Li et al. | |
| 2015/0080357 A1 | 3/2015 | Li et al. | |
| 2015/0139903 A1 | 5/2015 | Li et al. | |
| 2015/0197528 A1 | 7/2015 | Li et al. | |
| 2015/0259353 A1 | 9/2015 | Li et al. | |
| 2016/0083390 A1 | 3/2016 | Li et al. | |
| 2019/0282552 A1 | 9/2019 | Höglinger et al. | |

FOREIGN PATENT DOCUMENTS

| | | |
|---|---|---|
| WO | WO-2006/133261 A2 | 12/2006 |
| WO | WO-2008/063505 A1 | 5/2008 |
| WO | WO-2008/070095 A1 | 6/2008 |
| WO | WO-2009/075784 A1 | 6/2009 |
| WO | WO-2010/065148 A1 | 6/2010 |
| WO | WO-2010/065149 A1 | 6/2010 |
| WO | WO-2010/065151 A1 | 6/2010 |
| WO | WO-2010/098839 A1 | 9/2010 |
| WO | WO-2010/132127 A1 | 11/2010 |
| WO | WO-2011/043816 A1 | 4/2011 |
| WO | WO-2011/153129 A1 | 12/2011 |
| WO | WO-2011/153138 A1 | 12/2011 |
| WO | WO-2012/171016 A1 | 12/2012 |
| WO | WO-2013/192556 A2 | 12/2013 |
| WO | WO 2014/205354 A2 | 12/2014 |

OTHER PUBLICATIONS

PubChem-SID-404621094, "ITI214 free base," retrieved from https://pubchem.ncbi.nlm.nih.gov/substance/404621094 on Aug. 25, 2021, 5 pages.
PubChem-CID-74834073, "ITI214 free base," retrieved from https://pubchem.ncbi.nlm.nih.gov/compound/74834073 on Aug. 25, 2021, 11 pages.
Bastin, R. J., et al. "Salt Selection and Optimisation Procedures for Pharmaceutical New Chemical Entities," Organic Process Research & Development, vol. 4, pp. 427-435, (2000).
Bowker, M.J. "A Procedure for Salt Selection and Optimization," Handbook of Pharmaceutical Salts: Properties, Selection, and Use, Chapter 7, pp. 162-173, (2002).
Caira, M.R. "Crystalline Polymorphism of Organic Compounds," Topics in Current Chemistry, vol. 198, pp. 163-203, (1998).
Hilfiker, R. "Polymorphism in the Pharmaceutical Industry," pp. 1-19, (2006).

(Continued)

Primary Examiner — Susanna Moore
(74) Attorney, Agent, or Firm — Hoxie & Associates LLC

(57) ABSTRACT

The present invention relates to crystals of (6aR, 9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrazolo[4,3-e]pyrimidin-4(2H)-one, and methods of making and using such crystals.

20 Claims, 1 Drawing Sheet

(56) References Cited

OTHER PUBLICATIONS

International Search Report & Written Opinion of PCT/US2013/047123 issued on Dec. 6, 2013.
International Search Report & Written Opinion of PCT/US2014/043422 issued on Apr. 3, 2015.
Intra-Cellular Therapies, Inc., "Corporate Presentation" (Sep. 24, 2019), downloaded from https://ir.intracellulartherapies.com/static-files/93b08960-f01c-4864-aa22-8cadb3539753 (last accessed Mar. 13, 2023).
Lee, S., et al. "Large-Scale Aspects of Salt Formation: Processing of Intermediates and Final Products," Handbook of Pharmaceutical Salts: Properties, Selection, and Use, Chapters 8, pp. 191-192, 211-214, (2002).
Stahl, P. H., et al. "Monographs on Acids and Bases," Handbook of Pharmaceutical Salts: Properties, Selection, and Use, Chapters 12, pp. 265-266, 282-283, (2002).
West, A. R. "Solid Solutions," Solid State Chemistry and It's Applications, Chapter 10, p. 358, (1988).

Figure 1-A
Differential Scanning Calorimetry (DSC) thermograph of the non-solvate crystals
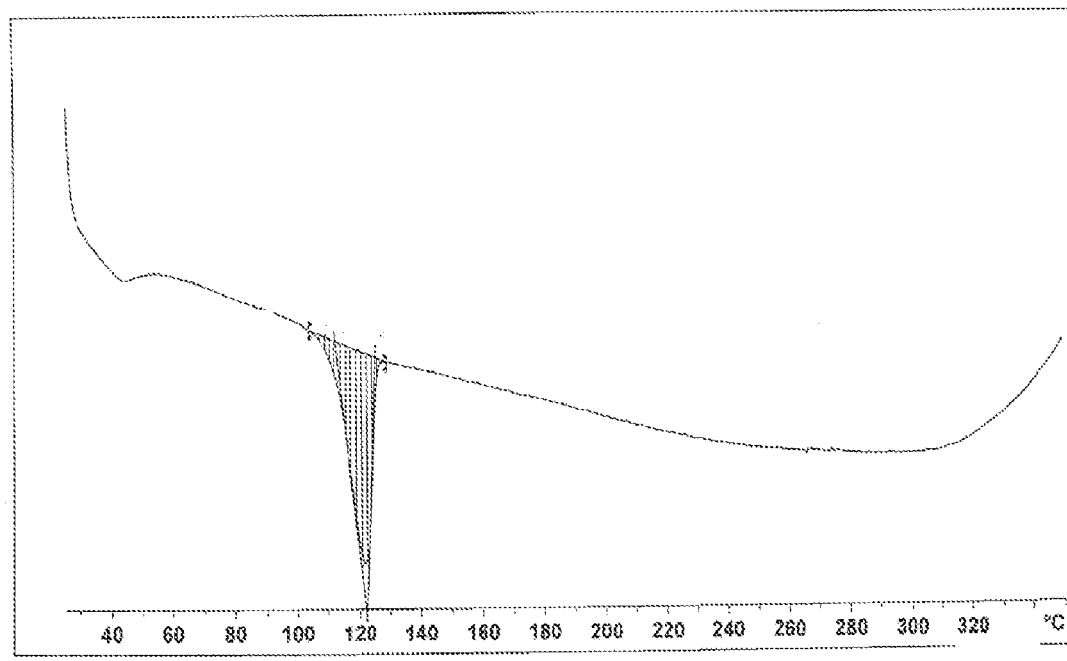
Figure 1-B
XRPD of the non-solvate crystals
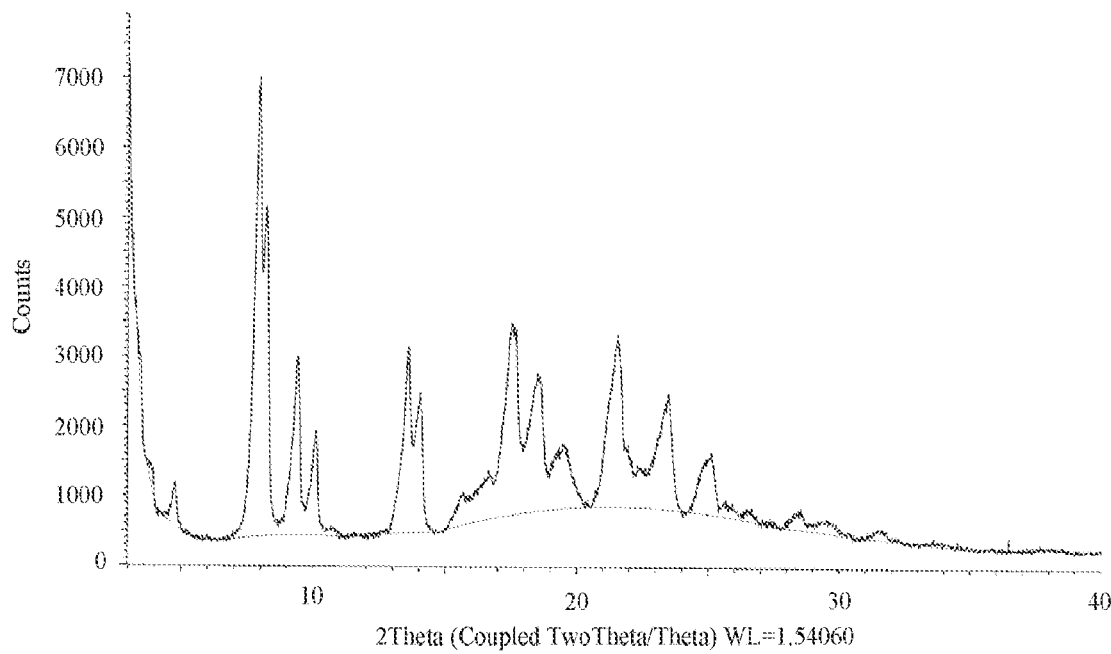

FREE BASE CRYSTALS

CROSS-REFERENCE TO RELATED APPLICATIONS

This application is a U.S. National Stage Application under 35 U.S.C. § 371 of International Application No. PCT/US2021/031197, filed on May 6, 2021, which claims priority to and the benefit of U.S. Provisional Application Ser. No. 63/020,972, filed on May 6, 2020, the contents of which are hereby incorporated by reference in their entireties.

FIELD OF THE INVENTION

The present invention relates to crystals of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one free base, as well as methods of making and using such free base crystals.

BACKGROUND OF THE INVENTION

The compound (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one is disclosed in WO 2009/075784 (U.S. Pub. No. 2010/0273754). This compound has been found to be a potent and selective phosphodiesterase 1 (PDE 1) inhibitor useful for the treatment or prophylaxis of disorders characterized by low levels of cAMP and/or cGMP in cells expressing PDE1, and/or reduced dopamine D1 receptor signaling activity (e.g., Parkinson's disease, Tourette's Syndrome, Autism, fragile X syndrome, ADHD, restless leg syndrome, depression, cognitive impairment of schizophrenia, narcolepsy); and/or any disease or condition that may be ameliorated by the enhancement of progesterone signaling. This list of disorders is exemplary and not intended to be exhaustive.

The publication WO 2009/075784 generally discloses the compound (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one in free base form and generally in pharmaceutically acceptable salt form. The monophosphate salt crystals of the compound (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one ("the Compound") is disclosed in U.S. Provisional Application No. 61/662,335. These applications, however, do not disclose specific crystals of the Compound in free base form and use of such free base crystals, which is now the subject of the current application.

SUMMARY OF THE INVENTION

Previously, the inventors found that the Compound (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one in free base form ("Compound A"), while exists as amorphous solids or oils in many solvent systems, can be isolated in crystalline form when specific solvent system and techniques are used. These free base crystals were stable and advantageous in the preparation of various salt crystals of said Compound A, e.g., a mono phosphate salt, the preparation of which salt crystals generally requires a very well-controlled stochiometric amount of the phosphoric acid to form a 1:1 Compound A to acid ratio.

The inventors have surprisingly found that synthesis of a non-solvate free base crystalline form of Compound A is possible using a combination of solvents previously known to lead to solvate forms of Compound A, e.g., methanol and ethanol. Without being bound to any particular theory, it is believed that the Compound A in such free base crystalline form contains minimum impurities compared to the amorphous form, allowing the amount of phosphoric acid for the preparation of the monophosphoric acid addition salt of the Compound A to be determined accurately, thereby producing the monophosphate salt crystals efficiently, consistently and reproducibly. Therefore, in the first aspect, the invention provides the following:

1.1 A crystal of Compound A, i.e., (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one free base ("free base crystal");

1.2 The free base crystal according to formula 1.1, wherein the free base crystal is in non-solvate form;

1.3 The free base crystal according to any of the preceding formulae, wherein the free base crystal is in non-hydrate or hydrate form;

1.4 The free base crystal according to any of the preceding formulae, wherein the free base crystal is in non-hydrate form;

1.5 The free base crystal according to any of the preceding formulae, wherein said free base crystal exhibits an X-ray powder diffraction pattern comprising at least five peaks having 2-theta angle values selected from the group consisting of 3.39, 3.77, 4.74, 7.94, 8.21, 9.41, 10.10, 10.69, 13.61, 14.04, 15.68, 16.68, 17.55, 18.52, 19.26, 19.49, 21.55, 21.95, 22.41, 23.43, 24.98, 25.05, 25.94, 26.57, 28.41, 29.70, 31.48, 31.53, and 31.65 degrees, wherein the XRPD pattern is measured in a diffractometer using copper anode, e.g., at wavelength alpha1 of 1.5406 Å and wavelength alpha2 of 1.5444 Å;

1.6 The free base crystal according to any of the preceding formulae, wherein said free base crystal exhibits an X-ray powder diffraction pattern comprising at least five peaks having 2-theta angle values selected from the group consisting of 7.94, 8.21, 9.41, 10.10, 13.61, 14.04, 17.55, 18.52, 21.55, and 23.43 degrees, wherein the XRPD pattern is measured in a diffractometer using copper anode, e.g., at wavelength alpha1 of 1.5406 Å and wavelength alpha2 of 1.5444 Å;

1.7 The free base crystal according to any of the preceding formulae, wherein said free base crystal exhibits an X-ray powder diffraction pattern comprising peaks having 2-theta angle values selected from the group consisting of 7.94, 8.21, 9.41, 13.61, and 17.55 degrees, wherein the XRPD pattern is measured in a diffractometer using copper anode, e.g., at wavelength alpha1 of 1.5406 Å and wavelength alpha2 of 1.5444 Å;

1.8 The free base crystal according to any of the preceding formulae, wherein said free base crystal exhibits an X-ray powder diffraction pattern comprising at least five peaks having d-spacing values selected from the group consisting of 26.08, 23.43, 18.63, 11.12, 10.76, 9.40, 8.75, 8.27, 6.50, 6.30, 5.65, 5.31, 5.05, 4.79, 4.60, 4.55, 4.12, 4.05, 3.96, 3.79, 3.56, 3.55, 3.43, 3.35, 3.14, 3.01, 2.84, 2.835, and 2.82 Å;

1.9 The free base crystal according to any of the preceding formulae, wherein said free base crystal exhibits an X-ray powder diffraction pattern comprising at least five peaks having d-spacing values selected from the group consisting of 11.12, 10.76, 9.40, 8.75, 6.50, 6.30, 5.05, 4.79, 4.12, and 3.79 Å;

1.10 The free base crystal according to any of the preceding formulae, wherein said free base crystal exhibits an X-ray powder diffraction pattern comprising at least five peaks having d-spacing values selected from the group consisting of 11.12, 10.76, 9.40, 6.50, and 5.05 Å;

1.11 The free base crystal according to any of the preceding formulae, wherein said free base crystal exhibits an X-ray powder diffraction pattern comprising at least five peaks having 2-theta angle and/or d-spacing values selected from those set forth in Table 1 below:

TABLE 1

| No | Pos. [°2 Th.] | d-spacing [Å] | Height [cps] | Rel. Int. [%] |
|---|---|---|---|---|
| 1 | 3.385 | 26.07741 | 245.951 | 3.7 |
| 2 | 3.767 | 23.43433 | 144.667 | 2.2 |
| 3 | 4.738 | 18.63416 | 502.993 | 7.6 |
| 4 | 7.941 | 11.12396 | 6579.230 | 100.0 |
| 5 | 8.214 | 10.75587 | 4729.820 | 71.9 |
| 6 | 9.406 | 9.39538 | 2533.908 | 38.5 |
| 7 | 10.100 | 8.75070 | 1494.375 | 22.7 |
| 8 | 10.693 | 8.26693 | 75.223 | 1.1 |
| 9 | 13.609 | 6.50136 | 2654.824 | 40.4 |
| 10 | 14.039 | 6.30308 | 1964.348 | 29.9 |
| 11 | 15.684 | 5.64564 | 470.621 | 7.2 |
| 12 | 16.675 | 5.31235 | 656.481 | 10.0 |
| 13 | 17.551 | 5.04896 | 2731.090 | 41.5 |
| 14 | 18.517 | 4.78786 | 1932.488 | 29.4 |
| 15 | 19.260 | 4.60466 | 838.025 | 12.7 |
| 16 | 19.491 | 4.55057 | 880.668 | 13.4 |
| 17 | 21.545 | 4.12119 | 2496.962 | 38.0 |
| 18 | 21.953 | 4.04548 | 812.206 | 12.3 |
| 19 | 22.412 | 3.96379 | 573.369 | 8.7 |
| 20 | 23.428 | 3.79407 | 1561.283 | 23.7 |
| 21 | 24.979 | 3.56194 | 780.770 | 11.9 |
| 22 | 25.047 | 3.55233 | 800.767 | 12.2 |
| 23 | 25.938 | 3.43235 | 156.547 | 2.4 |
| 24 | 26.565 | 3.35274 | 150.062 | 2.3 |
| 25 | 28.411 | 3.13900 | 239.609 | 3.6 |
| 26 | 29.699 | 3.00569 | 168.262 | 2.6 |
| 27 | 31.481 | 2.83951 | 148.259 | 2.3 |
| 28 | 31.529 | 2.83528 | 146.680 | 2.2 |
| 29 | 31.653 | 2.82447 | 159.881 | 2.4 | wherein the XRPD pattern is measured in a diffractometer using copper anode, e.g., at wavelength alpha1 of 1.5406 Å and wavelength alpha2 of 1.5444 Å;

1.12 The free base crystal according to any of the preceding formulae, wherein said free base crystal exhibits an X-ray powder diffraction pattern comprising at least five peaks having 2-theta angle and/or d-spacing values selected from those set forth in Table 1-A below:

TABLE 1-A

| Pos. [°2 Th.] | d-spacing [Å] | Height [cps] | Rel. Int. [%] |
|---|---|---|---|
| 4 | 7.941 | 11.12396 | 6579.230 |
| 5 | 8.214 | 10.75587 | 4729.820 |
| 13 | 17.551 | 5.04896 | 2731.090 |
| 9 | 13.609 | 6.50136 | 2654.824 |
| 6 | 9.406 | 9.39538 | 2533.908 |
| 17 | 21.545 | 4.12119 | 2496.962 |
| 10 | 14.039 | 6.30308 | 1964.348 |
| 14 | 18.517 | 4.78786 | 1932.488 |
| 20 | 23.428 | 3.79407 | 1561.283 |
| 7 | 10.100 | 8.75070 | 1494.375 | wherein the XRPD pattern is measured in a diffractometer using copper anode, e.g., at wavelength alpha1 of 1.5406 Å and wavelength alpha2 of 1.5444 Å;

1.13 The free base crystal according to any of the preceding formulae, wherein said free base crystal exhibits an X-ray powder diffraction pattern corresponding with or substantially as depicted in FIG. 1-B;

1.14 The free base crystal according to any of the preceding formulae, wherein said free base crystal exhibits a Differential Scanning Calorimetry (DSC) pattern comprising an endothermic peak at about 121° C.-122° C.;

1.15 The free base crystal according to formula 1.14, wherein the crystal exhibits a Differential Scanning Calorimetry (DSC) pattern corresponding with or substantially as depicted in FIG. 1-A;

1.16 The free base crystal according to any of the above formulae, wherein said free base crystal is in a single crystal form and are free or substantially free of any other form, e.g., less than 10 wt. %, preferably less than about 5 wt. %, more preferably less than about 2 wt. %, still preferably less than about 1 wt. %, still preferably less than about 0.1%, most preferably less than about 0.01 wt. % of amorphous form;

1.17 The free base crystal according to any of the above formulae, wherein said free base crystal is in a single crystal form and are free or substantially free of any other form, e.g., less than 10 wt. %, preferably less than about 5 wt. %, more preferably less than about 2 wt. %, still preferably less than about 1 wt. %, still preferably less than about 0.1%, most preferably less than about 0.01 wt. % of other crystal forms;

1.18 The free base crystal according to any of the above formulae, wherein said free base crystal is in a single crystal form and are free or substantially free of any other form, e.g., less than 10 wt. %, preferably less than about 5 wt. %, more preferably less than about 2 wt. %, still preferably less than about 1 wt. %, still preferably less than about 0.1%, most preferably less than about 0.01 wt. % of amorphous and other crystal forms;

1.19 The free base crystal according to any of the above formulae, wherein said free base crystal is made by any of processes described or similarly described below in Process III or in any of Examples 1-2.

In the second aspect, the invention provides a process (Process I) for the preparation of a salt of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]-pyrazolo[4,3-e]pyrimidin-4(2H)-one (Compound A), comprising:

(1) dissolving a crystal of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one free base (Compound A), i.e., free base crystal of Compound A, in a non-solvate or solvate form in a solvent;

(2) adding an acid optionally in a solvent to the solution obtained in the step (1), and (3) stirring the mixture obtained in the step (2) to result in the objective salt.

In a further embodiment of the second aspect, the invention provides Process I, wherein the salt is a salt crystal, e.g., a fumarate (e.g., hemi-fumarate), phosphate (e.g., mono-phosphate), (1-hydrox-2)-naphthoate or mesylate salt crystal. Therefore, in a particular embodiment, useful acid of step (2) of Process I for making salt crystals of Compound A include fumaric acid, phosphoric acid, tartaric acid (e.g., L-tartaric acid) and methanesulfonic acid. The solvent useful for Process I to make salt crystals is methanol, acetonitrile, acetone or mixtures thereof. In another further embodiment, the salt is a benzoate salt crystal and useful acid of step (2) of Process I for making said benzoate salt crystal of Compound A is benzoic acid. The solvent useful for Process I to make the benzoate salt crystals includes ethyl acetate and xylene. In various embodiments, the acid is added in a 1:1 molar ratio relative to the free base crystal.

In a further embodiment of the second aspect, the invention provides a process (Process II) for the preparation of a mono-phosphate salt crystal of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one (mono-phosphate salt crystal of Compound A), comprising:
  (1) dissolving a crystal of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one free base (i.e., free base crystal of Compound A) in a non-solvate or solvate form in a solvent;
  (2) adding phosphoric acid in a solvent to the solution obtained in the step (1), and
  (3) stirring the mixture obtained in the step (2) to result in the objective mono-phosphate salt crystal.

In a further embodiment, the invention provides Process II for the preparation of a mono-phosphate salt crystal of Compound A as follows:
  2.1 Process II as hereinbefore described, wherein the solvent in the step (1) is selected from acetone and acetonitrile;
  2.2 Process II as hereinbefore described or 2.1, wherein the solvent in the step (2) is selected from acetone or acetonitrile;
  2.3 Process II as hereinbefore described or 2.1 or 2.2, wherein the amount of phosphoric acid to be added in the step (2) is almost (about) equimolecular quantity to the amount of crystal of the (6aR,9aS)-5,6a,7,8,9,9a-hexahydro-5-methyl-3-(phenylamino)-2-((4-(6-fluoro-pyridin-2-yl)phenyl)methyl)-cyclopent[4,5]imidazo[1,2-a]pyrazolo[4,3-e]pyrimidin-4(2H)-one free base (free base crystal of Compound A) in non-solvate form or in solvate form of the step (1); In a particular embodiment, the amount of phosphoric acid to be added in step (2) is 0.5 to 2.0 equivalent, more preferred 0.8 to 1.2 equivalent, and the most preferred, 0.9 to 1.1 equivalent of the amount of crystal of the (6aR,9aS)-5,6a,7,8,9,9a-hexahydro-5-methyl-3-(phenylamino)-2-((4-(6-fluoropyridin-2-yl)phenyl)methyl)imidazo[1,2-a]pyrazolo[4,3-e]pyrimidin-4(2H)-one free base (free base crystal of Compound A) in non-solvate form or in solvate form of the step (1);
  2.4 Process II as hereinbefore described or any of 2.1-2.3, wherein water is additionally added in the step (2);
  2.5 Process II as hereinbefore described or any of 2.1-2.4, wherein the mixture is stirred at 20 to 70° C. in the step (3);
  2.6 Process II as hereinbefore described or any of 2.1-2.4, wherein the mixture is stirred at about 50° C., about 32° C., about 38° C. or about 39° C.;
  2.7 Process II as hereinbefore described or any of 2.1-2.6, wherein the free base crystal of Compound A in step 1 is in a non-solvate form;
  2.8 Process II as hereinbefore described or any of 2.1-2.6, wherein the free base crystal of Compound A in step 1 is in a non-solvate form.
  2.9 Process II as hereinbefore described or any of 2.1-2.8, wherein the phosphoric acid is added in a 1:1 molar ratio relative to the free base crystal In a third aspect, the invention provides a process (Process III) for the preparation of a crystal of (6aR,9aS)-5,6a,7,8,9,9a-hexahydro-5-methyl-3-(phenylamino)-2-((4-(6-fluoro-pyridin-2-yl)phenyl)methyl)-cyclopent[4,5]imidazo[1,2-a]pyrazolo[4,3-e]pyrimidin-4(2H)-one free base (free base crystal of Compound A) in non-solvate form (Process III), which comprises:
  (1) stirring (6aR,9aS)-3-chloro-2-(4-(6-fluoropyridin-2-yl)benzyl)-5-methyl-5,6a,7,8,9,9a-hexahydrocyclopenta-[4,5]imidazo[1,2-a]pyrazolo[4,3-e]pyrimidin-4(2H)-one in a solvent in the presence of a base, an aniline, a palladium catalyst and a ligand, then separating the organic layer;
  (2) recrystallizing the product of step (1) in an alcohol solvent.
  3.1 Process III, wherein the base used in step (1) comprises one or more of carbonate, bicarbonate, phosphate or hydroxide of an alkali or alkaline earth metal (e.g. sodium, magnesium, calcium, potassium, cesium or barium carbonate, bicarbonate, hydroxide, butoxide or phosphate, for example sodium carbonate, sodium bicarbonate, sodium hydroxide, sodium t-butoxide, calcium carbonate, potassium carbonate, potassium hydroxide, potassium t-butoxide, potassium phosphate, cesium carbonate, cesium hydroxide).
  3.2 Any of the preceding processes, wherein the base according to step (1) of the process of the invention is potassium carbonate or $K_2CO_3$.
  3.3 Any of the preceding processes, wherein the palladium catalyst used in step (1) comprises palladium II acetate, palladium chloride, palladium bromide, $Pd(PPh_3)_4$, $PdCl_2(PPh_3)_2$, Pd $(dba)_2$, Pd/C and tris (dibenzylideneacetone)dipalladium(O).
  3.4 Any of the preceding processes, wherein the palladium catalyst used in step (1) is palladium II acetate or $Pd(OAc)_2$.
  3.5 Any of the preceding processes, wherein the ligand used in step (1) is a bidentate ligand (e.g., xantphos).
  3.6 Any of the preceding processes, wherein the solvent used in step (1) is an organic solvent (e.g., toluene, tetrahydrofuran, xylene, dimethylacetamide, preferable, xylene or combination of dimethylacetamide and xylene).
  3.7 Any of the preceding processes, wherein the solvent used in step (2) comprises methanol and/or ethanol.
  3.8 Any of the preceding processes, wherein the solvent used in step (2) is a combination of ethanol and methanol.
  3.9 Any of the preceding processes, wherein the solvent used in step (2) is a combination of ethanol and methanol in a ratio of 2 v/w:1 v/w.

3.10 Any of the preceding processes, wherein the process is carried out under nitrogen atmosphere.

3.11 Any of the preceding processes, wherein the separated organic layer of step (1) is washed and treated with charcoal to remove residual palladium catalyst.

3.12 Any of the preceding processes, wherein step (1) further comprises the step of adding water, e.g., before separating the organic layer.

3.13 Any of the preceding processes, wherein step (1) further comprises the step of adding a solution of cystein in water optionally with additional solvent (e.g., with additional dimethylacetamide and xylene).

3.14 Any of the preceding processes, wherein the crystal obtained through step (1) is in ethanol solvate form.

3.15 Any of the preceding processes, wherein the process is scaled to create the free base crystal in non-solvate form on a kilogram scale.

BRIEF DESCRIPTION OF THE DRAWINGS

FIG. 1-A depicts a Differential Scanning Calorimetry (DSC) thermograph of the non-solvate crystals of (6aR, 9aS)-3-chloro-2-(4-(6-fluoropyridin-2-yl)benzyl)-5-methyl-5,6a,7,8,9,9a-hexahydrocyclopenta-[4,5]imidazo[1,2-a]pyrazolo[4,3-e]pyrimidin-4(2H)-one free base (Compound A) according to the present disclosure.

FIG. 1-B depicts an X-ray Powder Diffraction pattern of the non-solvate crystals of (6aR,9aS)-3-chloro-2-(4-(6-fluoropyridin-2-yl)benzyl)-5-methyl-5,6a,7,8,9,9a-hexahydro-cyclopenta-[4,5]imidazo[1,2-a]pyrazolo[4,3-e]pyrimidin-4(2H)-one free base (Compound A) according to the present disclosure.

DETAILED DESCRIPTION

As use herein, the term "crystal" or "crystals" or "crystalline" or "crystalinic" refers to any solid that has a short or long range order of the molecules, atoms or ions in a fixed lattice arrangement. Crystals of the present invention may be in a single crystal form. Therefore, the crystals of the present invention may be in a triclinic, monoclinic, orthorhombic, tetragonal, rhobohedral, hexagonal or cubic crystal form or mixtures thereof. In particular embodiment, the crystals of the present invention are in dry crystalline form. In another particular embodiment, the crystals of the present invention are substantially free of other forms, e.g., free of amorphous or other crystal forms.

The term "substantially free" of other crystal forms refers to less than about 10 wt. %, preferably less than about 5 wt. %, more preferably less than about 2 wt. %, still preferably less than about 1 wt. %, still preferably less than about 0.1%, most preferably less than about 0.01 wt. % of other crystal forms, e.g., amorphous or other crystal forms.

The term "predominantly" or "substantially entirely in a single form" refers to less than about 10 wt. %, preferably less than about 5 wt. %, more preferably less than about 2 wt. %, still preferably less than about 1 wt. %, still preferably less than about 0.1%, most preferably less than about 0.01 wt. % of other crystal forms, e.g., amorphous or other crystal forms.

In particular embodiments, the Crystals of the invention may be contained in an amount of solvent, e.g., in solvate form, or trace amounts of water, e.g., in hydrate form. Preferably, the Crystals of the invention are in non-solvate form. Still preferably, the crystals of the invention are in non-solvate and non-hydrate form.

The mono-phosphate salt crystals of the invention preferably have a free base to acid ratio of 1 to 1. For example, the phosphate salt crystal of the invention may comprise 1 molar equivalent of the free base to 1 molar equivalent of phosphate.

The term "solvate" refers to crystalline solid adducts containing either stoichiometric or nonstoichiometric amounts of a solvent incorporated within the crystal structure. Therefore, the term "non-solvate" form herein refers to crystals that are free or substantially free of solvent molecules within the crystal structures of the invention. Similarly, the term "non-hydrate" form herein refers to crystals that are free or substantially free of water molecules within the crystal structures of the invention.

The term "amorphous" form refers to solids of disordered arrangements of molecules and do not possess a distinguishable crystal lattice.

Unless further modified, the term "Compound A" refers to (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one in free base form, having the following structure:

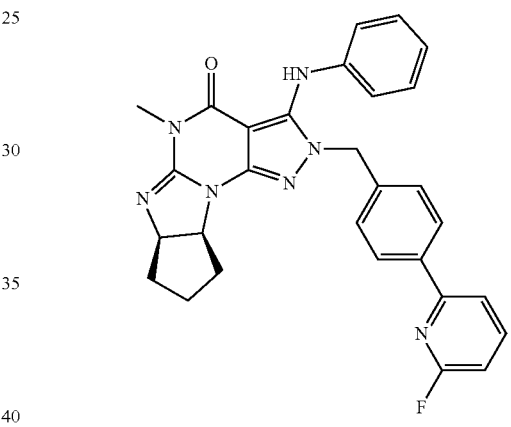

The phrase "crystal of Compound A" refers to the crystal of the compound A in free base form. The term "free base crystal" is also used to refer to such crystal. Therefore, "free base crystal of Compound A" also refers to the crystal of Compound A in free base form. The term "salt crystal" is intended to refer to the crystal of Compound A in salt form.

The crystallinity or the morphology of the crystals of the present Invention may be determined by a number of methods, including, but not limited to single crystal X-ray diffraction, X-ray powder diffraction, polarizing optical microscopy, thermal microscopy, differential scanning calorimetry (DSC), thermogravimetric analysis (TGA), infrared adsorption spectroscopy and Raman spectroscopy. Characterization of solvates or hydrates or lack thereof may also be determined by DSC and/or TGA.

It is to be understood that X-ray powder diffraction and the differential scanning calorimetry pattern of a given sample may vary a little depending on the instrument used, the time and temperature of the sample when measured and standard experimental errors. Therefore, the temperature and the 2-theta values, d-spacing values, heights and relative intensity of the peaks as set forth herein in Tables 1-1A or in FIGS. 1-2 will have an acceptable level of deviation. For example, the values may have an acceptable deviation of e.g., about 20%, 15%, 10%, 5%, 3%, 2% or 1%. In one embodiment, the 2-theta values and/or d-spacing values of the XRPD pattern of the crystals of the current invention have an acceptable deviation of ±0.2 degrees and/or Å. Further, the XRPD pattern of the crystals of the invention may be identified by the characteristic peaks as recognized by one skilled in the art. For example, the crystals of the invention may be identified by e.g., at least five characteristic peaks, e.g., at least three or at least five peaks, e.g., at least three or at least five peaks having 2-theta values and/or at least three or at least five peaks having d-spacing values as set forth in the XRPD patterns set forth herein. In another embodiment, the crystals of the invention may be identified by 2-theta values and/or d-spacing values as set forth in the XRPD patterns provided herein. Therefore, the term "corresponding with or substantially as" set forth in any of Tables 1-A or depicted in FIG. 1-B refers to any crystals which have an XRPD pattern comprising the major or characteristic peaks as set forth in the tables/figures.

The term "about" in front of a numerical value refers to the numerical value itself or the numerical value itself±20%, ±15%, ±10%, preferably ±5%, preferably ±3%, preferably ±2%, preferably ±1% of that value. For example, when referencing temperature, the term "about" refers to the temperature itself±10° C., preferably ±5° C., preferably ±3° C. of the reference temperature. In another example, when referencing 2-theta angle values, the term "about" refers to the numerical 2-theta angle value itself±0.2 degrees of the reference 2-theta angle value. In still another example, when referencing d-spacing values, the term "about" refers to the numerical 2-theta angle value itself±0.2 Å of of the reference d-spacing value.

EXAMPLES

The method of making the Compound (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one is generally described in WO 2009/075784, the contents of which are incorporated by reference in their entirety. This compound can also be prepared as summarized or similarly summarized in the following reaction Schemes 1 and 2.

Scheme 1

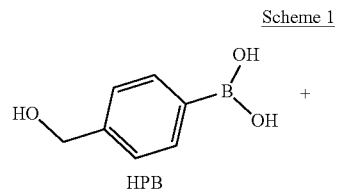

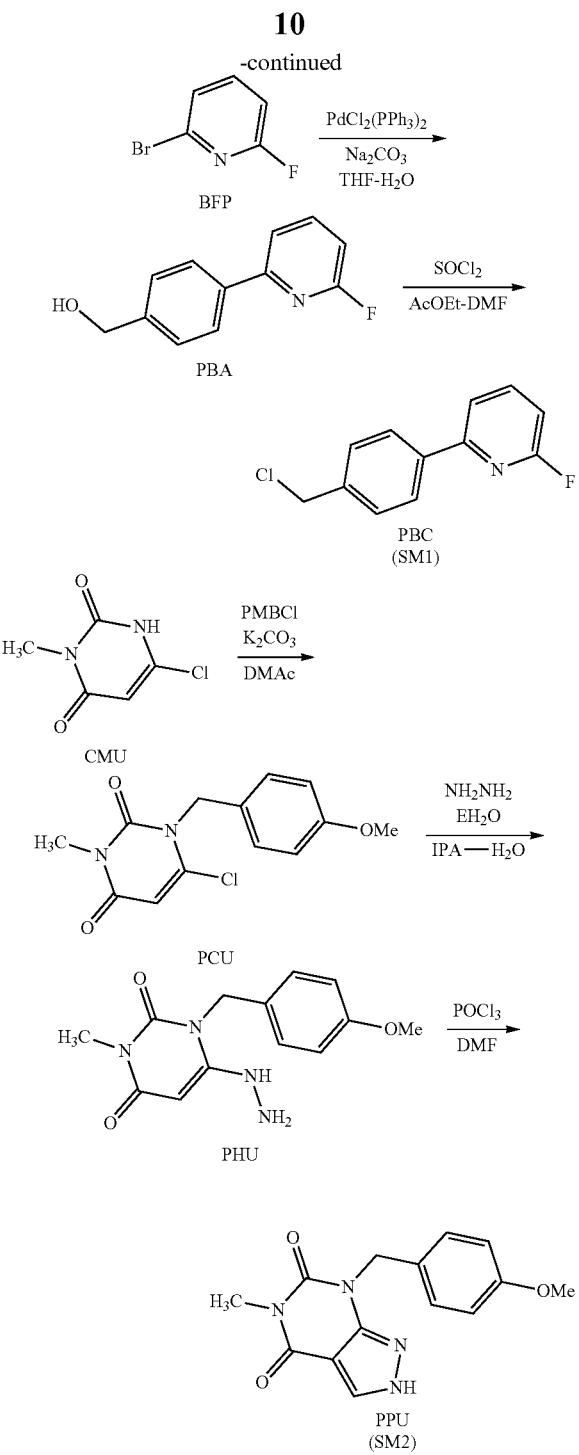

Scheme 2

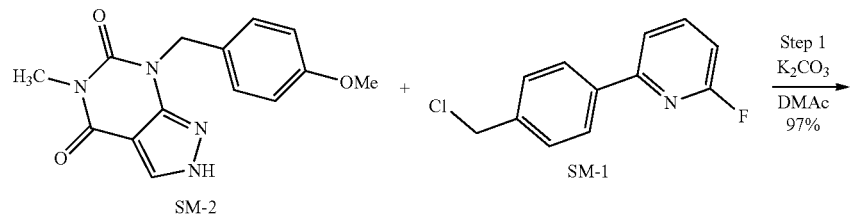

-continued
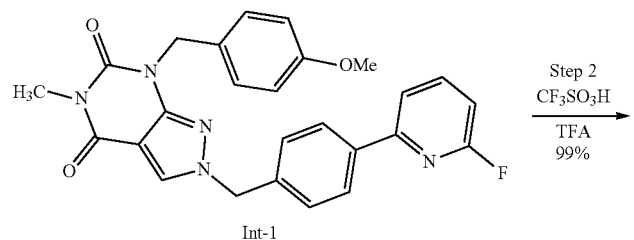
Int-1
Step 2
CF₃SO₃H
TFA
99%
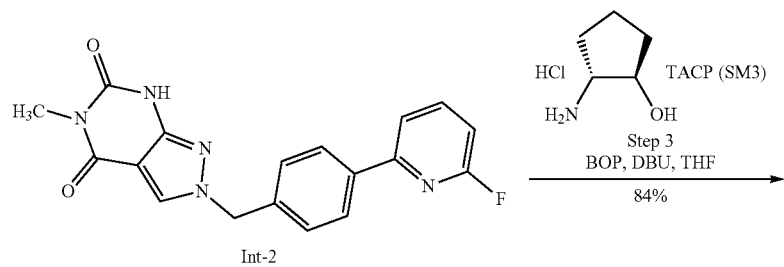
Int-2
Step 3
BOP, DBU, THF
84%
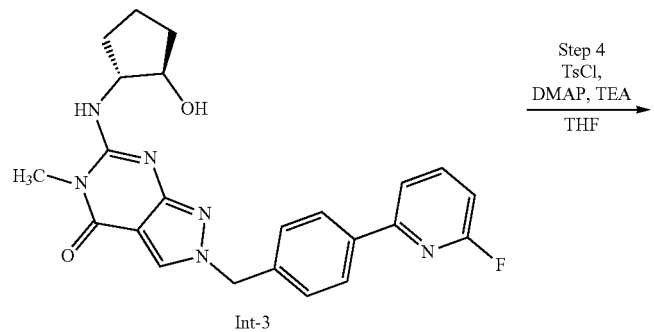
Int-3
Step 4
TsCl,
DMAP, TEA
THF
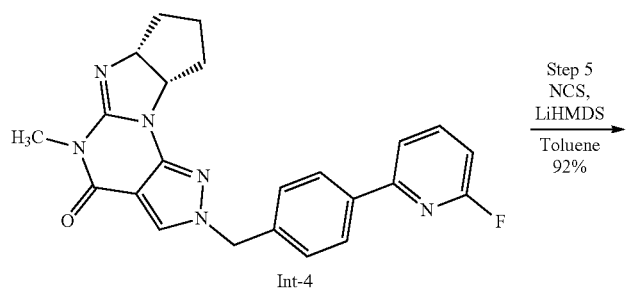
Int-4
Step 5
NCS,
LiHMDS
Toluene
92%
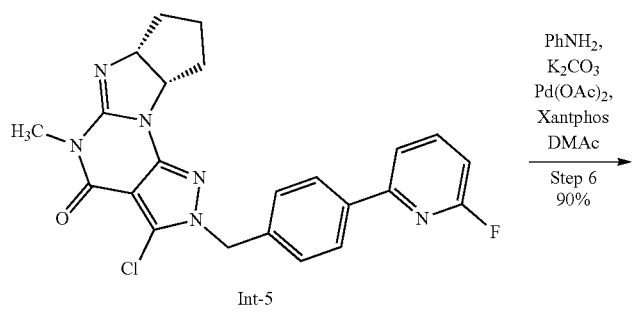
Int-5
PhNH₂,
K₂CO₃
Pd(OAc)₂,
Xantphos
DMAc
Step 6
90%

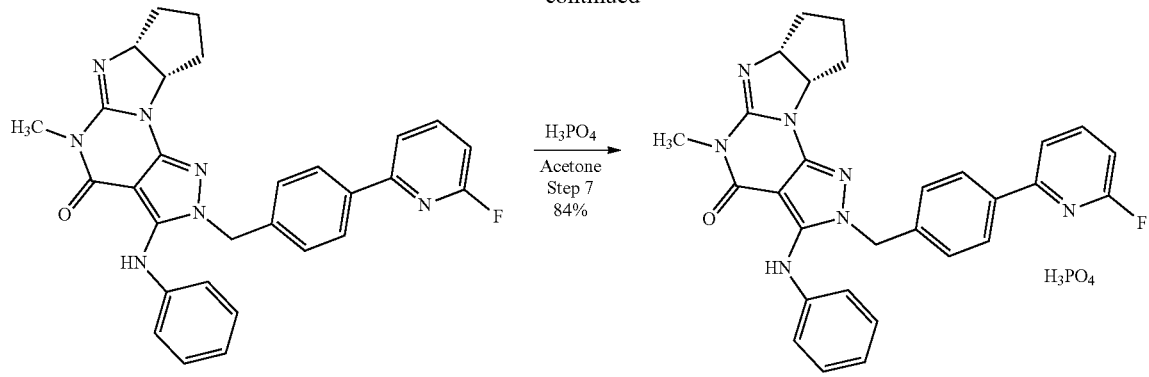

In particular, (6aR,9aS)-3-chloro-2-(4-(6-fluoropyridin-2-yl)benzyl)-5-methyl-5,6a,7,8,9,9a-hexahydrocyclopenta[4,5]imidazo[1,2-a]pyrazolo[4,3-e]pyrimidin-4(2H)-one (Int-5) may be prepared as described or similarly described below. The free base crystals and the mono-phosphate salt crystals of the invention may be prepared by using the methods described or similarly described in Examples 1-14 below.

Example 1

Preparation of (6aR,9aS)-3-chloro-2-(4-(6-fluoropyridin-2-yl)benzyl)-5-methyl-5,6a,7,8,9,9a-hexahydrocyclopenta[4,5]imidazo[1,2-a]pyrazolo[4,3-e]pyrimidin-4(2H)-one 2-(4-(6-fluoropyridin-2-yl)benzyl)-7-(4-methoxybenzyl)-5-methyl-2H-pyrazolo[3,4-d]pyrimidine-4,6(5H,7H)-dione

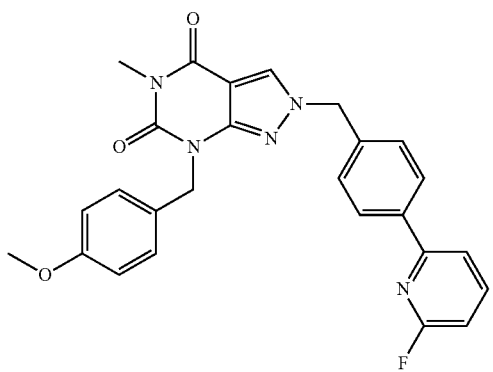 [SMILES: COc1ccc(Cn2c(=O)n(C)c(=O)c3cn(Cc4ccc(-c5cccc(F)n5)cc4)nc32)cc1]

Quantities of 2-(4-(chloromethyl)phenyl)-6-fluoropyridine, and 7-(4-methoxybenzyl)-5-methyl-2H-pyrazolo[3,4-d]pyrimidine-4,6(5H,7H)-dione were synthesized according to Scheme 1 above, and as further described in International Publication WO2014205354 A2, which is herein incorporated by reference in its entirety. The mixture of 2-(4-(chloromethyl)phenyl)-6-fluoropyridine (24.0 kg), 7-(4-methoxybenzyl)-5-methyl-2H-pyrazolo[3,4-d]pyrimidine-4,6(5H,7H)-dione (31.0 kg), K$_2$CO$_3$ (15.0 kg) and DMAc (562.2 kg) is stirred at 20° C. The slurry is agitated at 45° C. for 3 h under nitrogen until reaction completion. Water (600 kg) is added at a temperature of at least 50° C., and the mixture is stirred at about 30° C. for at least 16 h. The crystals are isolated by filtration, washed with a mixture of DMAc and water (120.0 kg) and dried to give 2-(4-(6-fluoropyridin-2-yl)benzyl)-7-(4-methoxybenzyl)-5-methyl-2H-pyrazolo[3,4-d]pyrimidine-4,6(5H,7H)-dione (50.2 kg). $^1$H NMR (500 MHz, DMSO-d$_6$) δ 3.21 (s, 3H), 3.66 (s, 3H), 4.98 (s, 2H), 5.45 (s, 2H), 6.77-6.82 (m, 2H), 7.13-7.16 (m, 1H), 7.25-7.30 (m, 2H), 7.41-7.44 (m, 2H), 7.92-7.96 (m, 1H), 8.04-8.11 (m, 3H), 8.68 (s, 1H).

2-(4-(6-fluoropyridin-2-yl)benzyl)-5-methyl-2H-pyrazolo[3,4-d]pyrimidine-4,6(5H,7H)-dione

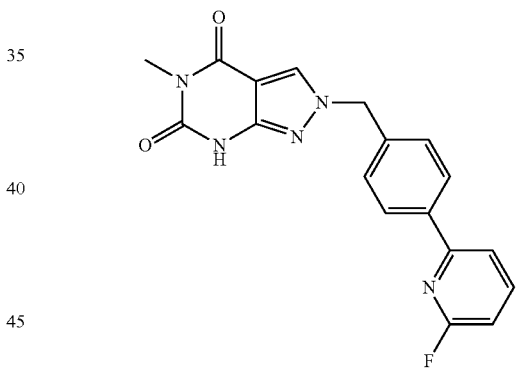

The mixture of 2-(4-(6-fluoropyridin-2-yl)benzyl)-7-(4-methoxybenzyl)-5-methyl-2H-pyrazolo[3,4-d]pyrimidine-4,6(5H,7H)-dione (50.1 kg), CF$_3$COOH (209 kg) and CF$_3$SO$_3$H (47.9 kg) is stirred at room temperature for at least 24 h under nitrogen. Acetonitrile (329.3 kg) is added while maintaining temperature of over 30° C. The mixture is added to a mixture of 25% NH$_4$OH (414.9 kg) and acetonitrile (146.5 kg) at about 30° C. The mixture is stirred at room temperature for 2 h. The crystals are isolated by filtration, washed with a mixture of acetonitrile (92.3 kg) and water (117.1 kg) and dried to give the crude product. The mixture of the crude product and AcOEt (504 kg) is stirred at room temperature for 16 h. The crystals are isolated by filtration, washed with AcOEt (106.1 kg) and dried to give 2-(4-(6-fluoropyridin-2-yl)benzyl)-5-methyl-2H-pyrazolo[3,4-d]pyrimidine-4,6(5H,7H)-dione (52.3 kg). $^1$H NMR (500 MHz, DMSO-d$_6$) δ 3.16 (s, 3H), 3.50-4.00 (br, 1H), 5.40 (s, 2H), 7.13-7.16 (m, 1H), 7.41-7.44 (m, 2H), 7.91-7.94 (m, 1H), 8.04-8.10 (m, 3H), 8.60 (s, 1H).

2-(4-(6-fluoropyridin-2-yl)benzyl)-6-(((1R,2R)-2-hydroxycyclopentyl)amino)-5-methyl-2H-pyrazolo[3,4-d]pyrimidin-4(5H)-one

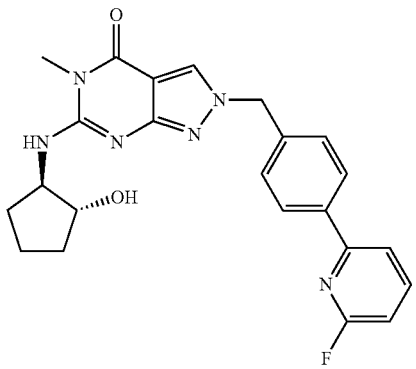 [SMILES: Cn1c(N[C@@H]2CCC[C@H]2O)nc2nn(Cc3ccc(-c4cccc(F)n4)cc3)cc2c1=O]

The mixture of BOP reagent (53 kg), 2-(4-(6-fluoropyridin-2-yl)benzyl)-5-methyl-2H-pyrazolo[3,4-d]pyrimidine-4,6(5H,7H)-dione (33.7 kg), DBU (58.4 kg) and THF (450 kg) is stirred at room temperature for 2 h under nitrogen. (1R,2R)-2-Aminocyclopentanol hydrochloride (15.8 kg) is added and the mixture is stirred at room temperature for 4 h. After the addition of 5% NaCl (170 kg) and AcOEt (306.7 kg), the organic layer is separated. The organic layer is washed with 5% NaCl (170 kg), 1M HCl 15% NaCl (170 kg), 5% NaCl (170 kg), 5% NaHCO₃ (170 kg) and 5% NaCl (272 kg) successively. After treatment with active charcoal, the organic layer is concentrated to 400 mL. After the addition of acetonitrile (800 mL), the mixture is concentrated to 140 L. After the addition of acetonitrile (267.2 kg), seed crystals are added at about 45° C. The mixture is concentrated to 170 L. Water (340 kg) is added at room temperature and the mixture is stirred for 2 h. The crystals are isolated by filtration, washed with the mixture of acetonitrile and water (1:2, 79 kg) and dried to give 2-(4-(6-fluoropyridin-2-yl)benzyl)-6-(((1R,2R)-2-hydroxycyclopentyl)amino)-5-methyl-2H-pyrazolo[3,4-d]pyrimidin-4(5H)-one (53.93 kg). $^1$H NMR (500 MHz, CDCl₃) δ 1.47-1.59 (m, 1H), 1.68-1.93 (m, 3H), 2.02-2.12 (m, 1H), 2.24-2.34 (m, 1H), 3.42 (s, 3H), 3.98-4.12 (m, 2H), 4.68-4.70 (m, 1H), 5.37 (s, 2H), 6.86-6.90 (m, 1H), 7.36-7.42 (m, 2H), 7.58-7.63 (m, 1H), 7.81-7.88 (m, 1H), 7.89 (s, 1H), 7.97-8.01 (m, 2H).

(6aR,9aS)-2-(4-(6-fluoropyridin-2-yl)benzyl)-5-methyl-5,6a,7,8,9,9a-hexahydrocyclopenta[4,5]imidazo[1,2-a]pyrazolo[4,3-e]pyrimidin-4(2H)-one

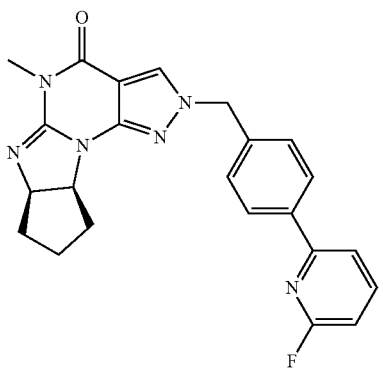 [SMILES: CN1C(=O)c2cn(Cc3ccc(-c4cccc(F)n4)cc3)nc2N2C1=N[C@@H]1CCC[C@@H]12]

The mixture of 2-(4-(6-fluoropyridin-2-yl)benzyl)-6-(((1R,2R)-2-hydroxycyclopentyl)amino)-5-methyl-2H-pyrazolo[3,4-d]pyrimidin-4(5H)-one (31.6 kg), p-toluenesulfonylchloride (15.9 kg), Et₃N (12.7 kg), N,N-dimethylaminopyridine (10.2 kg) and THF (205.4 kg) is stirred at 60° C. for 22 h under nitrogen. To the mixture is added 8M NaOH (4.8 kg) at about 40° C. and the mixture is stirred for 2 h. After the addition of 5% NaCl (165 kg) and AcOEt (178.6 kg), the organic layer is separated. The organic layer is washed with 5% NaCl (165 kg). The organic layer is concentrated to 66 L. After the addition of MeOH (800 mL), the mixture is concentrated to 240 mL. After the addition of MeOH (261.4 kg), the mixture is concentrated to 100 L. After the addition of MeOH (52.3 kg), the mixture is stirred at room temperature for 2 h and at 0° C. for another 2 h. The crystals are isolated by filtration, washed with cold MeOH (52.3 kg) and dried to give (6aR,9aS)-2-(4-(6-fluoropyridin-2-yl)benzyl)-5-methyl-5,6a,7,8,9,9a-hexahydrocyclopenta[4,5]imidazo[1,2-a]pyrazolo[4,3-e]pyrimidin-4(2H)-one (26.24 kg). $^1$H NMR (500 MHz, CDCl₃) δ 1.39-1.54 (m, 1H), 1.58-1.81 (m, 3H), 1.81-1.92 (m, 1H), 2.12-2.22 (m, 1H), 3.28 (s, 3H), 4.61-4.70 (m, 2H), 5.20 (s, 2H), 6.79-6.85 (m, 1H), 7.25-7.32 (m, 2H), 7.53-7.58 (m, 1H), 7.68 (s, 1H), 7.75-7.83 (m, 1H), 7.92-7.98 (m, 2H).

(6aR,9aS)-3-chloro-2-(4-(6-fluoropyridin-2-yl)benzyl)-5-methyl-5,6a,7,8,9,9a-hexahydrocyclopenta[4,5]imidazo[1,2-a]pyrazolo[4,3-e]pyrimidin-4(2H)-one

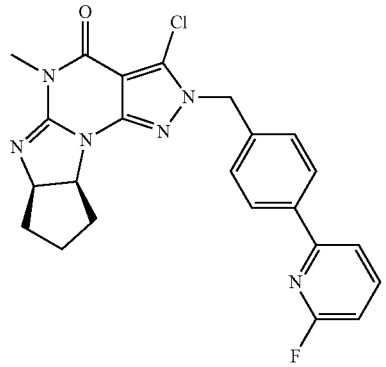 [SMILES: CN1C(=O)c2c(nn(Cc3ccc(-c4cccc(F)n4)cc3)c2Cl)N2C1=N[C@@H]1CCC[C@@H]12]

The mixture of (6aR,9aS)-2-(4-(6-fluoropyridin-2-yl)benzyl)-5-methyl-5,6a,7,8,9,9a-hexahydrocyclopenta[4,5]imidazo[1,2-a]pyrazolo[4,3-e]pyrimidin-4(2H)-one (26.2 kg) and toluene (338.1 kg) is concentrated to 260 L under the nitrogen atmosphere. Toluene (180.4 kg) and NCS (12.5 kg) is added. To the mixture is added LiHMDS (1M THF solution, 97.4 kg) at 0° C. and the mixture is stirred for 1 h. To the mixture is added 20% NH₄Cl (27.3 kg) at about 10° C. The mixture is concentrated to 80 L. After the addition of EtOH (102.6 kg), the mixture is concentrated to 50 L. After the addition of EtOH (102.6 kg), the mixture is concentrated to 100 L. After the addition of EtOH (82.1 kg), the mixture is warmed to 50° C. Water (156 kg) is added and the mixture is stirred at 50° C. for 0.5 h. After stirring at room temperature for 5 h, the crystals are isolated by filtration, washed with the mixture of EtOH and water (1:1, 52 L) and dried to give (6aR,9aS)-3-chloro-2-(4-(6-fluoropyridin-2-yl)benzyl)-5-methyl-5,6a,7,8,9,9a-hexahydrocyclopenta[4,5]imidazo[1,2-a]pyrazolo[4,3-e]pyrimidin-4(2H)-one (26.0 kg). $^1$H NMR (500 MHz, CDCl₃) δ 1.46-1.61 (m, 1H), 1.67-1.90

(m, 3H), 1.92-2.00 (m, 1H), 2.19-2.27 (m, 1H), 3.37 (s, 3H), 4.66-4.77 (m, 2H), 5.34 (s, 2H), 6.87-6.93 (m, 1H), 7.35-7.41 (m, 2H), 7.59-7.65 (m, 1H), 7.82-7.91 (m, 1H), 7.97-8.05 (m, 2H).

Crude (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one

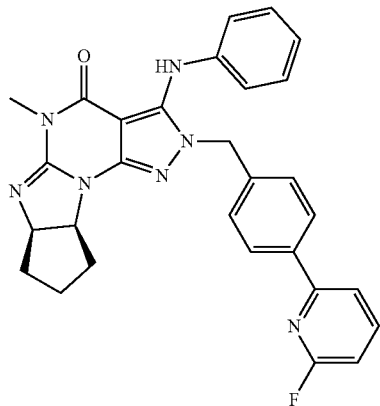 [SMILES: CN1C(=O)c2c(nn(Cc3ccc(-c4cccc(F)n4)cc3)c2Nc2ccccc2)N2C1=N[C@@H]1CCC[C@@H]12]

The mixture of (6aR,9aS)-3-chloro-2-(4-(6-fluoropyridin-2-yl)benzyl)-5-methyl-5,6a,7,8,9,9a-hexahydrocyclopenta[4,5]imidazo[1,2-a]pyrazolo[4,3-e]pyrimidin-4(2H)-one (25.9 kg), palladium acetate (130.2 kg), xantphos (335.6 g), potassium carbonate powder (15.9 kg), aniline (8.1 kg) and dimethylacetamide (122.2 kg) are stirred at 120° C. for 5 h. After addition of active charcoal (2.6 kg) and 3-mercaptopropyl ethyl sulphide silica (SPM32, 2.6 kg), toluene (112.7 kg) is added into the mixture at a temperature of 75° C. and stirred for 1 h. A solution of 5% NaCl (182 kg) is added to the mixture at room temperature and stirred for 0.5 h, and the organic layer is separated. After washing the organic layer with water (130 kg) twice, 3-mercaptopropyl ethyl sulphide silica (SPM32, 1.3 kg), is added to the mixture at 45° C. and stirred for 8 h. After filtering out the 3-mercaptopropyl ethyl sulphide silica, the mixture is washed with toluene (45 kg) and concentrated to 40 L. EtOH (102.6 kg) is added to the mixture, which is then concentrated to 40 L. After the addition of EtOH (102.6 kg), the mixture is concentrated to 100 L. EtOH (82.1 kg) is added to the mixture at 45° C. and stirred for 1 h. To the mixture is added n-heptane (249 kg) at about 50° C. and stirred for 2 h. After cooling to room temperature, the cake is washed with EtOH/water (1:3 ratio, 39 L), and EtOH/heptane (1:3 ratio, 117 L) is added at room temperature. The slurry is mixed for 0.5 h. The wet cake is washed with EtOH/heptane (1:3 ratio, 78 L) and dried to give crude (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one (20.6 kg). Structure confirmed by $^1$H NMR to be an ethanol solvate with 7.84 wt. % EtOH.

Example 2

Crystals of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one free base non-solvate

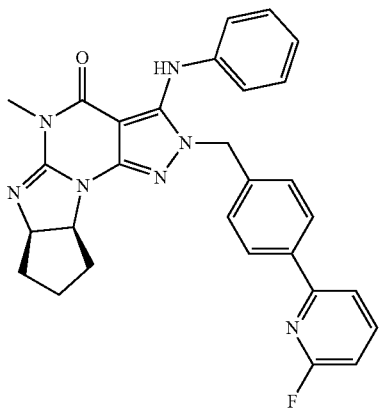 [SMILES: CN1C(=O)c2c(nn(Cc3ccc(-c4cccc(F)n4)cc3)c2Nc2ccccc2)N2C1=N[C@@H]1CCC[C@@H]12]

20.4 kg of crude Compound A generated through the method of Example 1 was added to 79.1 kg methanol and heated at 55° C. until a clear solution was formed. 157.8 kg ethanol was added slowly to the solution while 55° C. temperature was maintained. The solution was cooled to 45° C. and stirred for 30 minutes. The solution was cooled to 20° C. until a thick slurry formed. The slurry was cooled to 5° C. and stirred for 1 h. The slurry was filtered, and the filter cake was washed with 31.6 kg ethanol twice. The wet cake (33.4 kg) was dried at 50° C. for 12 h under nitrogen. The resulting crystalline solid (14.1 kg) was white to tan. The structure was confirmed by 1H NMR as a non-solvate crystalline form of Compound A.

The Differential Scanning Calorimetry (DSC) thermograph of non-solvate free base crystals is obtained as described or similarly described herein and the DSC is depicted in FIG. 1-A. Approximately 3 mg of sample is weighed into an aluminum DSC pan and sealed hermetic lid (crimped). The sample is then loaded into a Mettler Toledo TGA/DSC1 Star Systemat 30° C. The sample is heated from 30 to 250° C. at scan rate of 10° C./min and the resulting heat flow response is monitored. An 80 mL/min nitrogen purge is used to prevent thermally induced oxidation of the sample during heating and to reduce the thermal lag through the sample to increase the instrument sensitivity.

The XRPD of non-solvate free base crystals is obtained as described or similarly described herein. The result is depicted in FIG. 1-B. Approximately 20 mg of sample is gently put on the XRPD glass sample holder. The sample is then loaded into a Bruker D2 Phaser and analyzed using the following experimental conditions.

Tube anode: Cu
Generator tension: 30 kV
Tube current: 15 mA
Wavelength alpha 1: 1.5406 A
Wavelength alpha 2: 1.5444 A
Start angle [2 theta]: 3
End angle [2 theta]: 40
Scan speed 6.000°/min
Scan step size: 0.02

The XRPD pattern of non-solvate free base crystals is depicted in FIG. 1-B and has peaks as set forth in Table 1 below:

TABLE 1

| No | Pos. [°2 Th.] | d-spacing [Å] | Height [cps] | Rel. Int. [%] |
|---|---|---|---|---|
| 1 | 3.385 | 26.07741 | 245.951 | 3.7 |
| 2 | 3.767 | 23.43433 | 144.667 | 2.2 |
| 3 | 4.738 | 18.63416 | 502.993 | 7.6 |
| 4 | 7.941 | 11.12396 | 6579.230 | 100.0 |
| 5 | 8.214 | 10.75587 | 4729.820 | 71.9 |
| 6 | 9.406 | 9.39538 | 2533.908 | 38.5 |
| 7 | 10.100 | 8.75070 | 1494.375 | 22.7 |
| 8 | 10.693 | 8.26693 | 75.223 | 1.1 |
| 9 | 13.609 | 6.50136 | 2654.824 | 40.4 |
| 10 | 14.039 | 6.30308 | 1964.348 | 29.9 |
| 11 | 15.684 | 5.64564 | 470.621 | 7.2 |
| 12 | 16.675 | 5.31235 | 656.481 | 10.0 |
| 13 | 17.551 | 5.04896 | 2731.090 | 41.5 |
| 14 | 18.517 | 4.78786 | 1932.488 | 29.4 |
| 15 | 19.260 | 4.60466 | 838.025 | 12.7 |
| 16 | 19.491 | 4.55057 | 880.668 | 13.4 |
| 17 | 21.545 | 4.12119 | 2496.962 | 38.0 |
| 18 | 21.953 | 4.04548 | 812.206 | 12.3 |
| 19 | 22.412 | 3.96379 | 573.369 | 8.7 |
| 20 | 23.428 | 3.79407 | 1561.283 | 23.7 |
| 21 | 24.979 | 3.56194 | 780.770 | 11.9 |
| 22 | 25.047 | 3.55233 | 800.767 | 12.2 |
| 23 | 25.938 | 3.43235 | 156.547 | 2.4 |
| 24 | 26.565 | 3.35274 | 150.062 | 2.3 |
| 25 | 28.411 | 3.13900 | 239.609 | 3.6 |
| 26 | 29.699 | 3.00569 | 168.262 | 2.6 |
| 27 | 31.481 | 2.83951 | 148.259 | 2.3 |
| 28 | 31.529 | 2.83528 | 146.680 | 2.2 |
| 29 | 31.653 | 2.82447 | 159.881 | 2.4 |

Example 3

Crystals of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one mono-phosphate salt

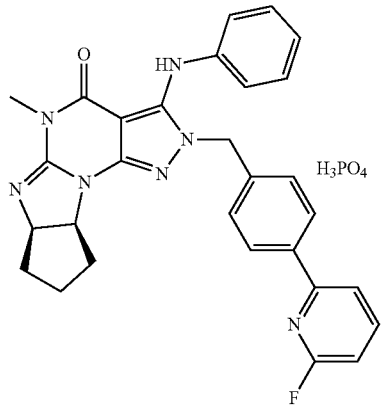

20.4 kg of non-solvate crystalline Compound A as generated through the method of Example 2 was added to 42.3 L of acetonitrile. The mixture was heated to about 50° C. until all of Compound A was dissolved. After addition of active charcoal (1.2 kg) and 3-mercaptopropyl ethyl sulphide silica (SPM32, 1.2 kg), the mixture was stirred at 50° C. for 3 hours. Insoluble solids were removed by filtration and washed with acetonitrile. The filtrate and the washing are combined and warmed to 50° C. A solution of 85 wt. % phosphoric acid (3.0 kg mL) in acetonitrile (56.4 L) is added at the same temperature. After addition of water (14.1 kg), the mixture is stirred at 50° C. for 1 h. The solution is cooled to 5° C. and agitated for 1 hour. The crystals are isolated by filtration, washed with acetonitrile (42.3 L×3) and dried to give (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one mono-phosphate salt (12.4 kg).

The invention claimed is:

1. A crystal of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one free base (Compound A) as shown by the following chemical formula:

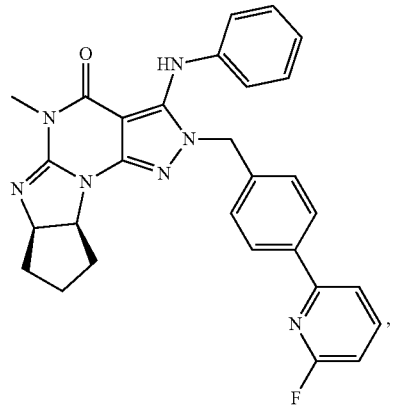 [SMILES: CN1C(=O)c2c(nn(Cc3ccc(-c4cccc(F)n4)cc3)c2Nc2ccccc2)N2C1=N[C@@H]1CCC[C@@H]12]

wherein said free base crystal exhibits an X-ray powder diffraction pattern comprising at least five peaks having 2-theta angle values selected from the group consisting of 3.39, 3.77, 4.74, 7.94, 8.21, 9.41, 10.10, 10.69, 13.61, 14.04, 15.68, 16.68, 17.55, 18.52, 19.26, 19.49, 21.55, 21.95, 22.41, 23.43, 24.98, 25.05, 25.94, 26.57, 28.41, 29.70, 31.48, 31.53, and 31.65 degrees, wherein the XRPD pattern is measured in a diffractometer using copper anode.

2. The free base crystal according to claim 1, wherein said free base crystal exhibits an X-ray powder diffraction pattern comprising at least five peaks having 2-theta angle values selected from the group consisting of 7.94, 8.21, 9.41, 10.10, 13.61, 14.04, 17.55, 18.52, 21.55, and 23.43 degrees, wherein the XRPD pattern is measured in a diffractometer using copper anode.

3. The free base crystal according to claim 1, wherein said free base crystal exhibits an X-ray powder diffraction pattern comprising peaks having 2-theta angle values selected from the group consisting of 7.94, 8.21, 9.41, 13.61, and 17.55 degrees, wherein the XRPD pattern is measured in a diffractometer using copper anode.

4. A crystal of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one free base (Compound A) as shown by the following chemical formula:

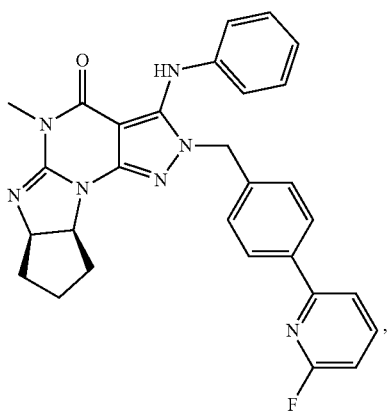 [SMILES: CN1C(=O)c2c(nn(Cc3ccc(-c4cccc(F)n4)cc3)c2Nc2ccccc2)N2C1=N[C@@H]1CCC[C@@H]12]

wherein said free base crystal exhibits an X-ray powder diffraction pattern comprising at least five d-spacing values selected from the group consisting of 26.08, 23.43, 18.63, 11.12, 10.76, 9.40, 8.75, 8.27, 6.50, 6.30, 5.65, 5.31, 5.05, 4.79, 4.60, 4.55, 4.12, 4.05, 3.96, 3.79, 3.56, 3.55, 3.43, 3.35, 3.14, 3.01, 2.84, 2.835, and 2.82 Å.

5. The free base crystal according to claim 4, wherein said free base crystal exhibits an X-ray powder diffraction pattern comprising at least five d-spacing values selected from the group consisting of 11.12, 10.76, 9.40, 8.75, 6.50, 6.30, 5.05, 4.79, 4.12, and 3.79 Å.

6. The free base crystal according to claim 4, wherein said free base crystal exhibits an X-ray powder diffraction pattern having d-spacing values selected from the group consisting of 11.12, 10.76, 9.40, 6.50, and 5.05 Å.

7. The free base crystal according to claim 1, wherein said free base crystal exhibits an X-ray powder diffraction pattern comprising at least five peaks having 2-theta angle and/or d-spacing values selected from those set forth in Table 1 below:

TABLE 1

| No | Pos. [°2 Th.] | d-spacing [Å] | Height [cps] | Rel. Int. [%] |
|---|---|---|---|---|
| 1 | 3.385 | 26.07741 | 245.951 | 3.7 |
| 2 | 3.767 | 23.43433 | 144.667 | 2.2 |
| 3 | 4.738 | 18.63416 | 502.993 | 7.6 |
| 4 | 7.941 | 11.12396 | 6579.230 | 100.0 |
| 5 | 8.214 | 10.75587 | 4729.820 | 71.9 |
| 6 | 9.406 | 9.39538 | 2533.908 | 38.5 |
| 7 | 10.100 | 8.75070 | 1494.375 | 22.7 |
| 8 | 10.693 | 8.26693 | 75.223 | 1.1 |
| 9 | 13.609 | 6.50136 | 2654.824 | 40.4 |
| 10 | 14.039 | 6.30308 | 1964.348 | 29.9 |
| 11 | 15.684 | 5.64564 | 470.621 | 7.2 |
| 12 | 16.675 | 5.31235 | 656.481 | 10.0 |
| 13 | 17.551 | 5.04896 | 2731.090 | 41.5 |
| 14 | 18.517 | 4.78786 | 1932.488 | 29.4 |
| 15 | 19.260 | 4.60466 | 838.025 | 12.7 |
| 16 | 19.491 | 4.55057 | 880.668 | 13.4 |
| 17 | 21.545 | 4.12119 | 2496.962 | 38.0 |
| 18 | 21.953 | 4.04548 | 812.206 | 12.3 |
| 19 | 22.412 | 3.96379 | 573.369 | 8.7 |
| 20 | 23.428 | 3.79407 | 1561.283 | 23.7 |
| 21 | 24.979 | 3.56194 | 780.770 | 11.9 |
| 22 | 25.047 | 3.55233 | 800.767 | 12.2 |
| 23 | 25.938 | 3.43235 | 156.547 | 2.4 |
| 24 | 26.565 | 3.35274 | 150.062 | 2.3 |
| 25 | 28.411 | 3.13900 | 239.609 | 3.6 |
| 26 | 29.699 | 3.00569 | 168.262 | 2.6 |
| 27 | 31.481 | 2.83951 | 148.259 | 2.3 |

TABLE 1-continued

| No | Pos. [°2 Th.] | d-spacing [Å] | Height [cps] | Rel. Int. [%] |
|---|---|---|---|---|
| 28 | 31.529 | 2.83528 | 146.680 | 2.2 |
| 29 | 31.653 | 2.82447 | 159.881 | 2.4 | wherein the XRPD pattern is measured in a diffractometer using copper anode.

8. The free base crystal according to claim 1, wherein said free base crystal exhibits an X-ray powder diffraction pattern comprising at least five peaks having 2-theta angle and/or d-spacing values selected from those set forth in Table 1-A below:

TABLE 1-A

| Pos. [°2 Th.] | d-spacing [Å] | Height [cps] | Rel. Int. [%] |
|---|---|---|---|
| 4 | 7.941 | 11.12396 | 6579.230 |
| 5 | 8.214 | 10.75587 | 4729.820 |
| 13 | 17.551 | 5.04896 | 2731.090 |
| 9 | 13.609 | 6.50136 | 2654.824 |
| 6 | 9.406 | 9.39538 | 2533.908 |
| 17 | 21.545 | 4.12119 | 2496.962 |
| 10 | 14.039 | 6.30308 | 1964.348 |
| 14 | 18.517 | 4.78786 | 1932.488 |
| 20 | 23.428 | 3.79407 | 1561.283 |
| 7 | 10.100 | 8.75070 | 1494.375 | wherein the XRPD pattern is measured in a diffractometer using copper anode.

9. The free base crystal according to claim 1, wherein said free base crystal exhibits an X-ray powder diffraction pattern corresponding with or substantially as depicted in FIG. 1-B.

10. The free base crystal according to claim 1, wherein said free base crystal exhibits a Differential Scanning Calorimetry (DSC) pattern comprising an endothermic peak at about 121° C.-122° C.

11. The free base crystal according to claim 10, wherein the crystal exhibits a Differential Scanning Calorimetry (DSC) pattern corresponding with or substantially as depicted in FIG. 1-A.

12. The free base crystal according to claim 1, wherein said free base crystal is in a single crystal form and are free or substantially free of any other form.

13. A process for the preparation of the crystal of (6aR, 9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one free base (Compound A) according to claim 1 in non-solvate form, which comprises:

(1) stirring (6aR,9aS)-3-chloro-2-(4-(6-fluoropyridin-2-yl)benzyl)-5-methyl-5,6a,7,8,9,9a-hexahydrocyclo-penta-[4,5]imidazo[1,2-a]pyrazolo[4,3-e]pyrimidin-4(2H)-one in a solvent in the presence of a base, an aniline, a palladium catalyst and a ligand, then separating the organic layer;

(2) recrystallizing the product of step (1) in an alcohol solvent.

14. The process according to claim 13, wherein the base used in step (1) comprises a carbonate, bicarbonate, phosphate or hydroxide of an alkali or alkaline earth metal, or combinations thereof.

15. The process according to claim 13, wherein the ligand used in step (1) is a bidentate ligand.

16. The process according to claim 13, wherein the solvent of step (1) is an organic solvent selected from toluene, tetrahydrofuran, xylene, dimethylacetamide, and combinations thereof.

17. The process according to claim 13, wherein the alcohol solvent used in step (2) comprises methanol and/or ethanol.

18. The process according to claim 13, wherein the alcohol solvent used in step (2) is a combination of ethanol and methanol.

19. A process for the preparation of a salt of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]-pyrazolo[4,3-e]pyrimidin-4(2H)-one (Compound A), comprising:
    (1) dissolving a crystal of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one free base (Compound A) according to claim 1 in a solvent;
    (2) adding an acid optionally in a solvent, to the solution obtained in the step (1), and
    (3) stirring the mixture obtained in the step (2) to result in the objective salt.

20. A process for the preparation of a mono-phosphate salt crystal of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]-pyrazolo[4,3-e]pyrimidin-4(2H)-one (Compound A), which comprises:
    (1) dissolving a crystal of (6aR,9aS)-5,6a,7,8,9,9a-hexahydro-5-methyl-3-(phenylamino)-2-((4-(6-fluoropyridin-2-yl)phenyl)methyl)-cyclopent[4,5]imidazo[1,2-a]pyrazolo[4,3-e]pyrimidin-4(2H)-one free base (Compound A) according to claim 1, in a solvent;
    (2) adding phosphoric acid in a solvent to the solution obtained in the step (1), and
    (3) stirring the mixture obtained in the step (2) to result in the objective mono-phosphate salt crystal.

* * * * *